United States Patent
Bojjanapalli et al.

(10) Patent No.: US 12,539,828 B2
(45) Date of Patent: Feb. 3, 2026

(54) POSITIVE LOCK FOR PARKED WIPER

(71) Applicant: Rosemount Aerospace Inc., Burnsville, MN (US)

(72) Inventors: Muralidhar Rao Bojjanapalli, Hyderabad (IN); Santosh Hiriyannaiah, Bangalore (IN)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 18/494,533

(22) Filed: Oct. 25, 2023

(65) Prior Publication Data
US 2025/0026312 A1    Jan. 23, 2025

(51) Int. Cl.
*B60S 1/34* (2006.01)
*B60S 1/08* (2006.01)
*B60S 1/26* (2006.01)
*B64C 1/14* (2006.01)

(52) U.S. Cl.
CPC ............ *B60S 1/3493* (2013.01); *B60S 1/08* (2013.01); *B60S 1/26* (2013.01); *B64C 1/14* (2013.01)

(58) Field of Classification Search
CPC .... B60S 1/0452; B60S 1/0455; B60S 1/0469; B60S 1/163; B60S 1/185
USPC ............. 15/250.16, 250.17, 250.3, 250.31
See application file for complete search history.

(56) References Cited

U.S. PATENT DOCUMENTS

| | | | |
|---|---|---|---|
| 2,357,152 A | 8/1944 | Whitted | |
| 3,070,959 A * | 1/1963 | Bruno | B64C 13/40 91/274 |
| 3,091,128 A * | 5/1963 | De Rees | B60S 1/163 318/DIG. 02 |
| 3,253,206 A * | 5/1966 | Romanowski | B60S 1/08 318/275 |
| 3,631,775 A * | 1/1972 | Tidd | B41B 21/16 359/821 |

(Continued)

FOREIGN PATENT DOCUMENTS

| | | |
|---|---|---|
| EP | 2011703 A2 | 1/2009 |
| EP | 2017146 A1 | 1/2009 |
| EP | 3778316 A1 | 2/2021 |

OTHER PUBLICATIONS

Extended European Search Report dated Nov. 29, 2024, for corresponding European Patent Application No. 24188300.8, 9 pgs.

*Primary Examiner* — Brian D Keller
*Assistant Examiner* — Jason Khalil Hawkins
(74) *Attorney, Agent, or Firm* — Kinney & Lange, P.A.

(57) ABSTRACT

A windshield wiper system for an aircraft includes a wiper arm and a wiper shaft with a first end connected to a base of the wiper arm. An electric motor is coupled to the wiper shaft to rotationally drive the wiper shaft. The windshield wiper system also includes a brake system. The brake system includes an electromagnet comprising an energized mode and a de-energized mode. The brake system also includes an anti-rotation assembly with a first element and a second element. The first element is connected directly to the wiper shaft. The second element is rotationally stationary relative the wiper shaft and the first element. The second element is configured to interlock with the first element to prevent rotation of the first element and the wiper shaft when both the electromagnet is in the de-energized mode and the wiper arm is in a park position.

4 Claims, 5 Drawing Sheets

(56) References Cited

U.S. PATENT DOCUMENTS

| | | | | |
|---|---|---|---|---|
| 3,688,334 | A | * 9/1972 | Peterson | B60S 1/3409 |
| | | | | 15/250.21 |
| 3,691,443 | A | * 9/1972 | Hammer | B60S 1/163 |
| | | | | 318/443 |
| 4,666,125 | A | * 5/1987 | Marts | F16K 31/0655 |
| | | | | 251/129.15 |
| 5,537,705 | A | 7/1996 | Battlogg | |
| 5,979,255 | A | 11/1999 | Huang et al. | |
| 6,944,906 | B2 | * 9/2005 | Moein | H02K 11/215 |
| | | | | 318/443 |
| 2018/0326949 | A1 | 11/2018 | Carrion et al. | |
| 2018/0370491 | A1 | 12/2018 | Brown et al. | |

* cited by examiner

POSITIVE LOCK FOR PARKED WIPER

BACKGROUND

The present disclosure relates to systems for wiping windshields, and in particular, to systems for wiping windshields on aircraft.

Windshield wiper systems are used in helicopters and other aircraft to remove dirt, water, and snow from the windshield and provide a clear view through the windshield for the pilots. In helicopters and other aircraft, the windshield wiper system is integrated with the wiper arm and blade on the windshield of the helicopter or other aircraft.

During operation, the wiper arm oscillates back and forth in an arc about a pivot. When the windshield wiper system is powered off, the wiper arm comes and stops at a designated position on the windshield, which is called 'park' position. The wiper arm is expected to stay in the designated park position during flight and during wiper non-operational time, so that the view of the pilot is not disturbed. Measures are required to prevent external aerodynamic forces acting on the wiper arm during flight from moving the wiper arm out of the park position.

SUMMARY

A windshield wiper system for an aircraft includes a wiper arm and a wiper shaft with a first end connected to a base of the wiper arm. The wiper shaft also includes a second end opposite the first end. An electric motor is coupled to the wiper shaft to rotationally drive the wiper shaft. The windshield wiper system also includes a brake system. The brake system includes an electromagnet comprising an energized mode and a de-energized mode. The brake system also includes an anti-rotation assembly with a first element and a second element. The first element is connected directly to the wiper shaft. The second element is rotationally stationary relative the wiper shaft and the first element. The second element is configured to interlock with the first element to prevent rotation of the first element and the wiper shaft when both the electromagnet is in the de-energized mode and the wiper arm is in a park position.

A windshield wiper system includes a wiper arm and a wiper shaft with a first end connected to a base of the wiper arm and a second end opposite the first end. The windshield wiper system further includes an electric motor that is rotationally connected to the wiper shaft and a brake system. The brake system includes a lock plate extending radially outward from the second end of the wiper shaft relative to a center axis of the wiper shaft. A hole extends into the lock plate. An electromagnetic plunger mechanism includes a plunger and an electromagnet. The plunger is aligned with the hole when the wiper arm is in a park position. The electromagnet is configured to interlock the plunger with the hole and disengage the plunger from the hole when the wiper arm is in the park position.

A method is disclosed for operating a windshield wiper system. The method includes sending, by an operator, an off signal to a system controller in communication with an electric motor that drives a wiper shaft connected to a wiper arm. In response to the off signal, the system controller directs the electric motor to rotate the wiper shaft to move the wiper arm to a park position on the windshield. The system controller deactivates the electric motor. The wiper shaft is locked into the park position by deactivating an electromagnetic mechanism, by the system controller, to allow a plunger to extend out of the electromagnetic mechanism and into a hole formed in a plate connected to the wiper shaft.

The present summary is provided only by way of example, and not limitation. Other aspects of the present disclosure will be appreciated in view of the entirety of the present disclosure, including the entire text, claims and accompanying figures.

While the above-identified drawing figure sets forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings. Like reference numerals identify similar structural elements.

DETAILED DESCRIPTION

This disclosure relates to a windshield wiper system for an aircraft with an electromagnetic brake on the wiper shaft. A gearbox is connected between a rotor shaft of an electric motor and the wiper shaft and transfers torque from the rotor shaft of the electric motor to the wiper shaft. When the wiper arm is in the park position, the electromagnetic brake locks the wiper shaft to prevent slop in the gearbox and aerodynamic forces acting on the wiper arm from rotating the wiper shaft and moving the wiper arm out of the park position. The windshield wiper system is discussed below with reference to FIGS. 1-3C.

Figure 1:
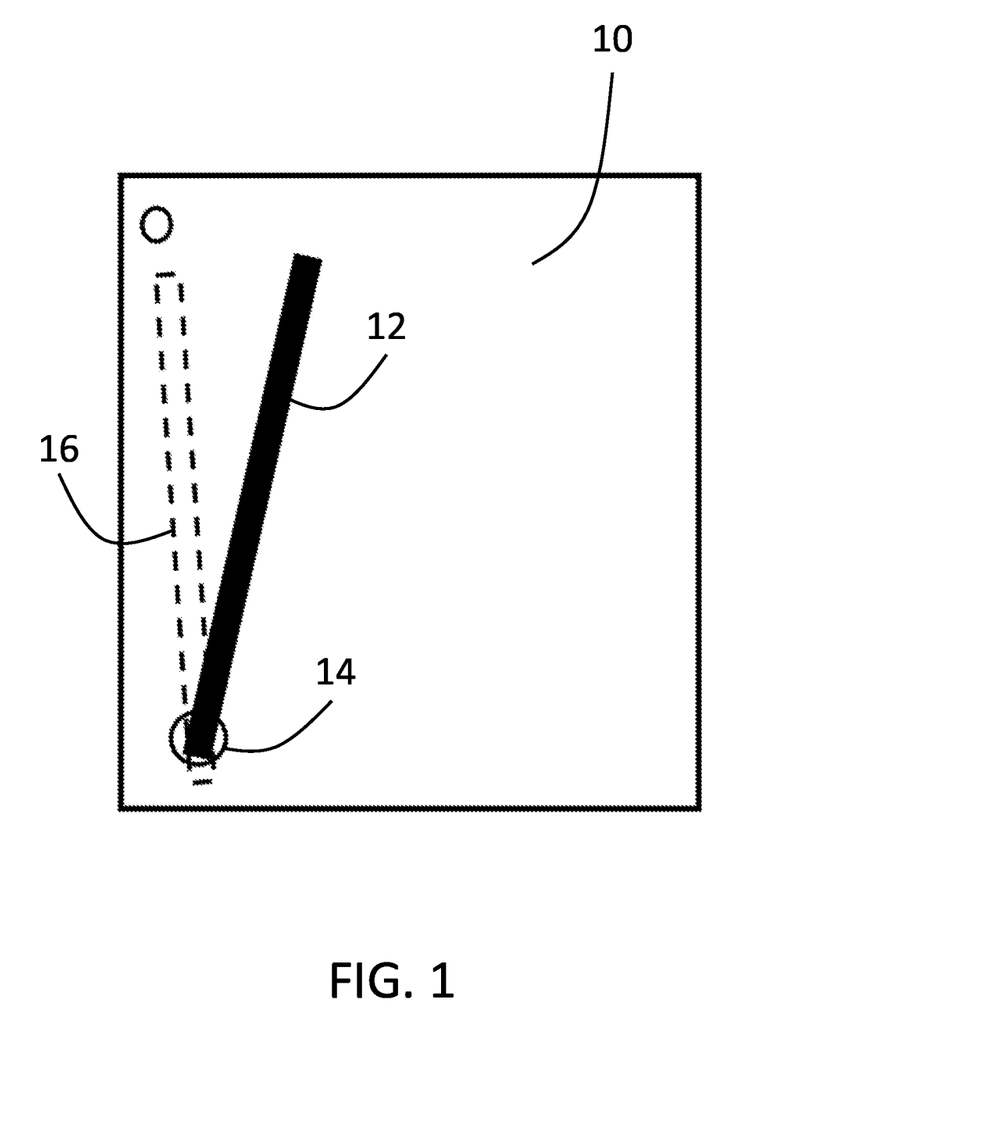
FIG. 1 is a schematic diagram of a windshield wiper arm on an aircraft windshield shifted out of a park position.

FIG. 1 is a schematic diagram of wiper arm 12 on windshield 10. Windshield 10 can be a windshield for a helicopter, an airplane, or other aircraft. Wiper arm 12 is connected to wiper shaft 14 and pivots on windshield 10 at wiper shaft 14. When wiper arm 12 is not in use to clear and clean windshield 10, wiper arm 12 is moved by shaft 14 to park position 16 at or near an edge of windshield 10. When in park position 16, wiper arm 12 does not obstruct or interfere with viewing through windshield 10 by a pilot or other operator on the aircraft. During flight of the aircraft, aerodynamic forces act on wiper arm 12. In some prior art systems, these aerodynamic forces can incrementally force wiper arm 12 out of park position 16 when wiper arm 12 is not in use. As discussed below with reference to FIGS. 2A-2C, an electromagnetic brake is connected to wiper shaft 14 to prevent wiper arm 12 from moving out of park position 16.

Figure 2A:
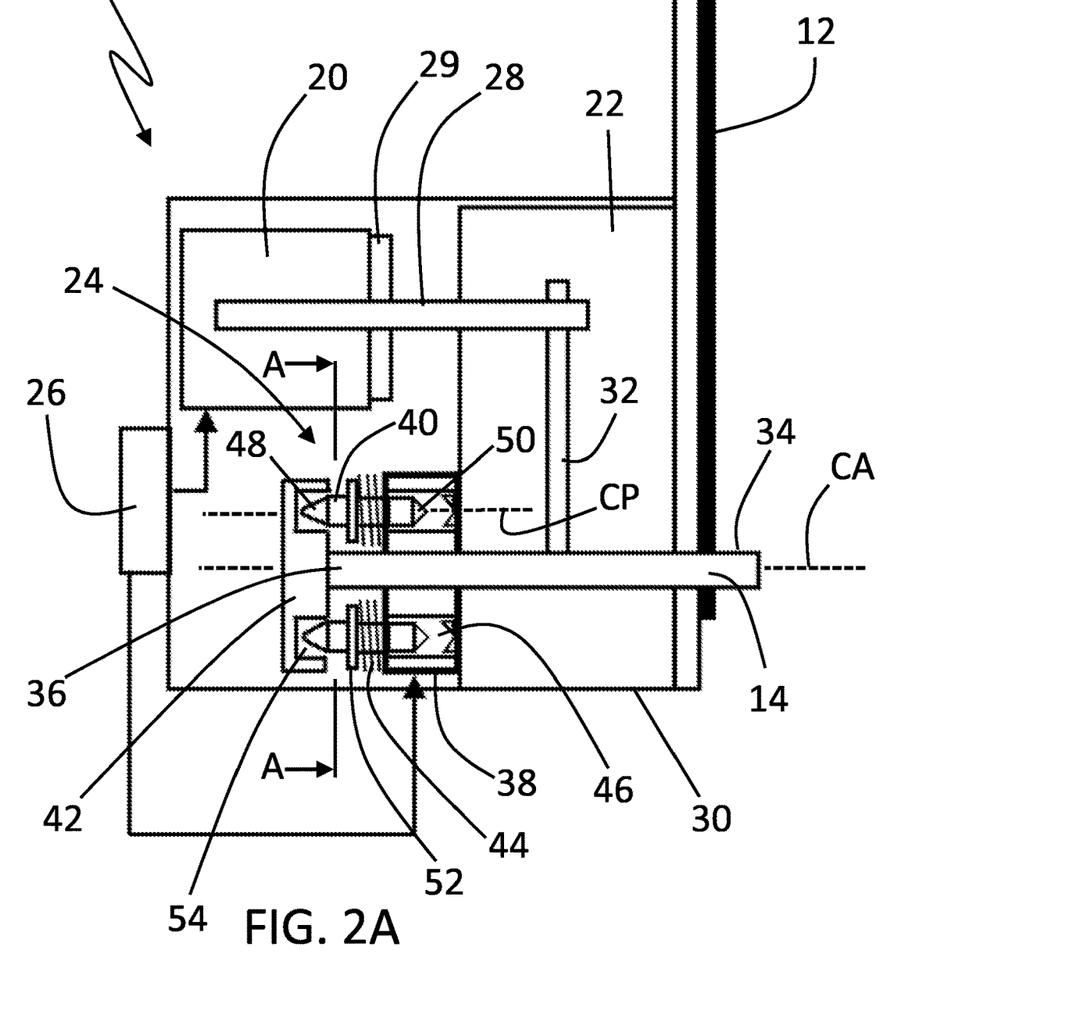
FIG. 2A is a schematic diagram of a windshield wiper system with a brake system locking a wiper shaft from rotation while a wiper arm is in the park position.
Figure 2B:
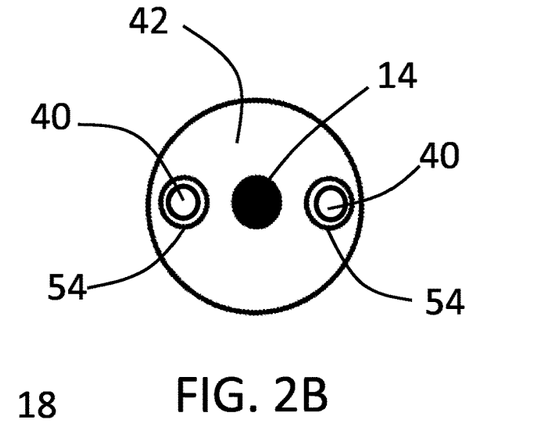
FIG. 2B is a cross-sectional view of the brake system from FIG. 2A taken along line A-A.
Figure 2C:
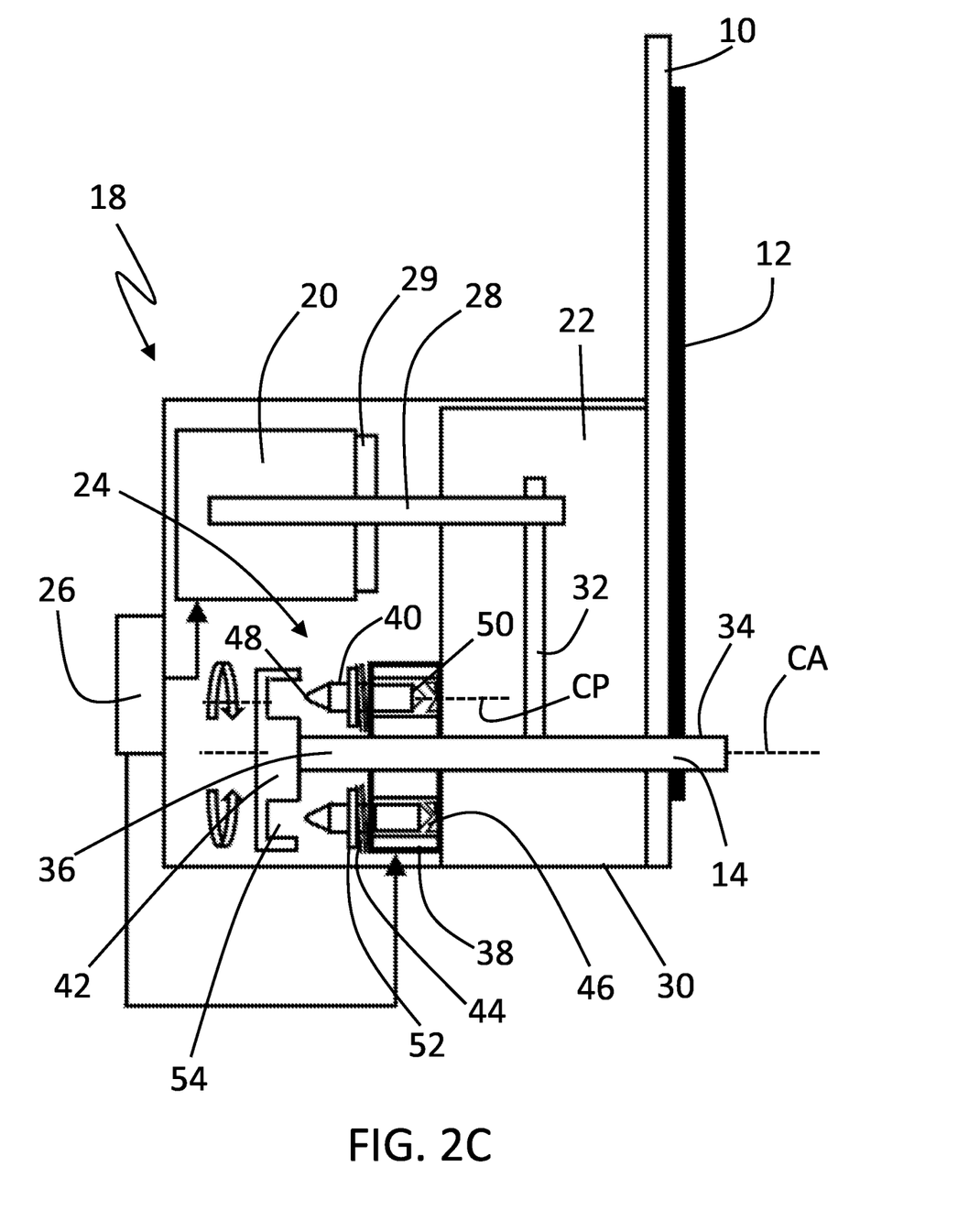
FIG. 2C is another schematic diagram of the windshield wiper system from FIG. 2A with the brake system disengaged such that the wiper shaft and the wiper arm can rotate out of the park position.

FIGS. 2A-2C will be discussed concurrently. FIG. 2A is a schematic diagram of windshield wiper system 18. In addition to windshield 10, wiper arm 12, and wiper shaft 14, windshield wiper system 18 includes electric motor 20, gearbox 22, brake system 24, and system controller 26. In the example of FIG. 2A, brake system 24 is in a de-energized mode that locks wiper shaft 14 with brake system 24 and prevents movement of wiper arm 12. FIG. 2B is a cross-sectional view of brake system 24 from FIG. 2A taken along line A-A. FIG. 2C is another schematic diagram of windshield wiper system 18 from FIG. 2A with brake system 24 in an energized mode such that wiper shaft 14 is unlocked with brake system 24 and wiper shaft 14 and wiper arm 12 can rotate out of park position 16. As shown best in FIGS. 2A and 2C, electric motor 20 includes motor rotor 28 and motor brake 29. Gearbox 22 includes housing 30 and gearing 32. Wiper shaft 14 includes first end 34, second end 36, and center axis CA. In the example of FIGS. 2A-2C, brake system 24 is an electromagnetic plunger mechanism that includes electromagnet 38, plunger rods 40, plate 42, and springs 44. Electromagnet 38 includes slots 46 and each of plunger rods 40 includes first rod end 48, second rod end 50, flange 52, and plunger center axis CP. Plate 42 includes holes 54.

First end 34 of wiper shaft 14 is connected to a base of wiper arm 12. Second end 36 of wiper shaft 14 is opposite first end 34 and wiper shaft 14 extends axially along center axis CA from first end 34 to second end 36. Electric motor 20 is coupled to wiper shaft 14 to rotationally drive wiper shaft 14. Electric motor 20, when energized, rotationally drives motor rotor 28. Gearbox 22 receives an end of motor rotor 28 and transfers rotational energy and torque from motor rotor 28 to wiper shaft 14 via gearing 32. While motor rotor 28 of electric motor 20 can rotate in a single direction (e.g., clockwise or counterclockwise), motor rotor 28 can drive gearbox 22 to cause wiper shaft 14 to rotate in both the clockwise and counterclockwise directions about center axis CA to cause wiper arm 12 to sweep back and forth on windshield 10. When electric motor 20 is not energized, motor break 29 can lock motor rotor 28 from rotating. Motor break 29 can be an electromagnetic motor that is de-energized to lock motor rotor 28 from rotating and energized to unlock motor rotor 28 such that motor rotor 28 can rotate. In the example of FIGS. 2A-2C, while motor break 29 can lock motor shaft 28 from rotating, motor break 29 alone is insufficient to maintain wiper arm 12 in park position 16. Brake system 24 is provided in windshield wiper system 18 to maintain wiper arm 12 in park position 16 when wiper arm 12 is not in use.

In the example of FIGS. 2A-2C, brake system 24 includes electromagnet 38 axially between first end 34 and second end 36 of wiper shaft 14. Electromagnet 38 can be annular and extend circumferentially about wiper shaft 14 relative to center axis CA. Slots 46 are formed in electromagnet 38 or a housing of electromagnet 38 and are spaced apart from one another circumferentially about center axis CA. Each of slots 46 is sized to receive one of plunger rods 40 in a sliding engagement. Electromagnet 38 drives brake system 24. Plunger rods 40, plate 42 with holes 54, and springs 44 together form an anti-rotation assembly for brake system 24. In the example of FIGS. 2A-2C, plate 42 is a first element of the anti-rotation assembly that is connected directly to wiper shaft 14 and rotates with wiper shaft 14 when electromagnet 38 is in the energized mode. Plate 42 extends radially outward from second end 36 of wiper shaft 14 relative to center axis CA of wiper shaft 14. Holes 54 extend axially into plate 42 relative center axis CA of wiper shaft 14 on the side of plate 42 facing plunger rods 40. As shown best in FIG. 2B, holes 54 are off center on plate 42 and spaced apart from one another circumferentially about center axis CA. When wiper arm 12 is in park position 16, holes 54 in plate 42 are aligned with slots 46. Thus, plunging rods 40 are only able to move in and out of holes 54 when wiper arm 12 is in park position 16.

Plunger rods 40 form a second element of the anti-rotation assembly of brake system 24 that is rotationally stationary relative to wiper shaft 14 and plate 42. Plunger rods 40 interlock with holes 54 in plate 42 to prevent rotation of plate 42 and wiper shaft 14 about center axis CA when both electromagnet 38 is in the de-energized mode and wiper arm 12 is in the park position. Each of plunger rods 40 is formed from a ferromagnetic material and is aligned with one of holes 54 in plate 42 when wiper arm 12 is in the park position. For each of plunger rods 40 first rod end 48 is conical and sized for insertion into one of holes 54 in plate 42. Second rod end 50 for each of plunger rods 40 is opposite first rod end 48 and is axially spaced from first rod end 48 relative to plunger center axis CP. Second rod end 50 for each of plunger rods 40 slides within one of slots 46 of a housing of electromagnet 38. For each of plunger rods 40, flange 52 is positioned axially between first rod end 48 and second rod end 50 relative to plunger center axis CP of plunger rod 40. Flange 52 extends radially outward from first rod end 48 and second rod end 50 relative to plunger center axis CP. Each of springs 44 extends circumferentially around one of plunger rods 40 and is compressed axially between flange 52 and the housing of electromagnet 38. Each of springs 44 biases its respective plunger rod 40 toward holes 54 in plate 42.

Electromagnet 38 is configured to interlock plunger rods 40 with holes 54 when electromagnet 38 is in a de-energized mode (as shown in FIG. 2A). The de-energized mode occurs for electromagnet 38 when electromagnet 38 does not receive any electrical current to power electromagnet 38. When in the de-energized mode, electromagnet 38 is unable to produce a magnetic field and springs 44 are able to push plunger rods 40 into holes 54. When electromagnet 38 is in an energized mode (as shown in FIG. 2C), electromagnet 38 is receiving an electrical current and is generating a magnetic field that attracts plunger rods 40 with enough force to compress springs 40 and slide plunger rods 40 out of holes 54 of plate 42. System controller 26 is in electrical communication with electromagnet 38 and electric motor 20. System controller 26 can be an electronic controller that controls electrical power to electric motor 20 (including motor break 29) and to electromagnet 38.

During operation of windshield wiper system 18, a human operator, such as an aircraft pilot, can send an "off" signal to system controller 26. System controller 26 directs, in response to the "off" signal, electric motor 20 to rotate wiper shaft 14 to move wiper arm 12 to park position 16 (shown in FIG. 1) on windshield 10. Once wiper arm 12 is in park position 16, system controller 26 can deactivate electric motor 20. System controller 26 locks wiper shaft 14 and wiper arm 12 in park position 16 by deactivating electromagnet 38, which stops electromagnet 38 from producing a magnetic field and allows springs 44 to push and move plunger rods 40 such that plunger rods 40 slide and extend further out of electromagnet 38 and into holes 54 of plate 42. With plunger rods 40 in holes 54, wiper shaft 14 is locked and unable to rotate, thereby keeping wiper arm 12 secured in park position 16. When the human operator desires to wipe and clean windshield 10 with wiper arm 12, the human operator can send an "on" signal to system controller 26. In response to the "on" signal, system controller 26 directs electrical current to electromagnet 38 to energize and activate electromagnet 38. Once energized, electromagnet 38 generates a magnetic field that is strong enough to pull plunger rods 40 toward electromagnet 38 and out holes 54. System controller 26 keeps electromagnet 38 energized while wiper arm 12 is in use. With wiper shaft 14 and wiper arm 12 unlocked, system controller 26 activates electric motor to rotate wiper shaft 14 and plate 42 to move wiper arm 12 out of park position 16. While FIGS. 2A-2C show a single example of windshield wiper system 18 and brake system 24, modifications and variations can be made from the example of FIGS. 2A-2C, as discussed below with reference to FIGS. 3A-3C.

Figure 3A:
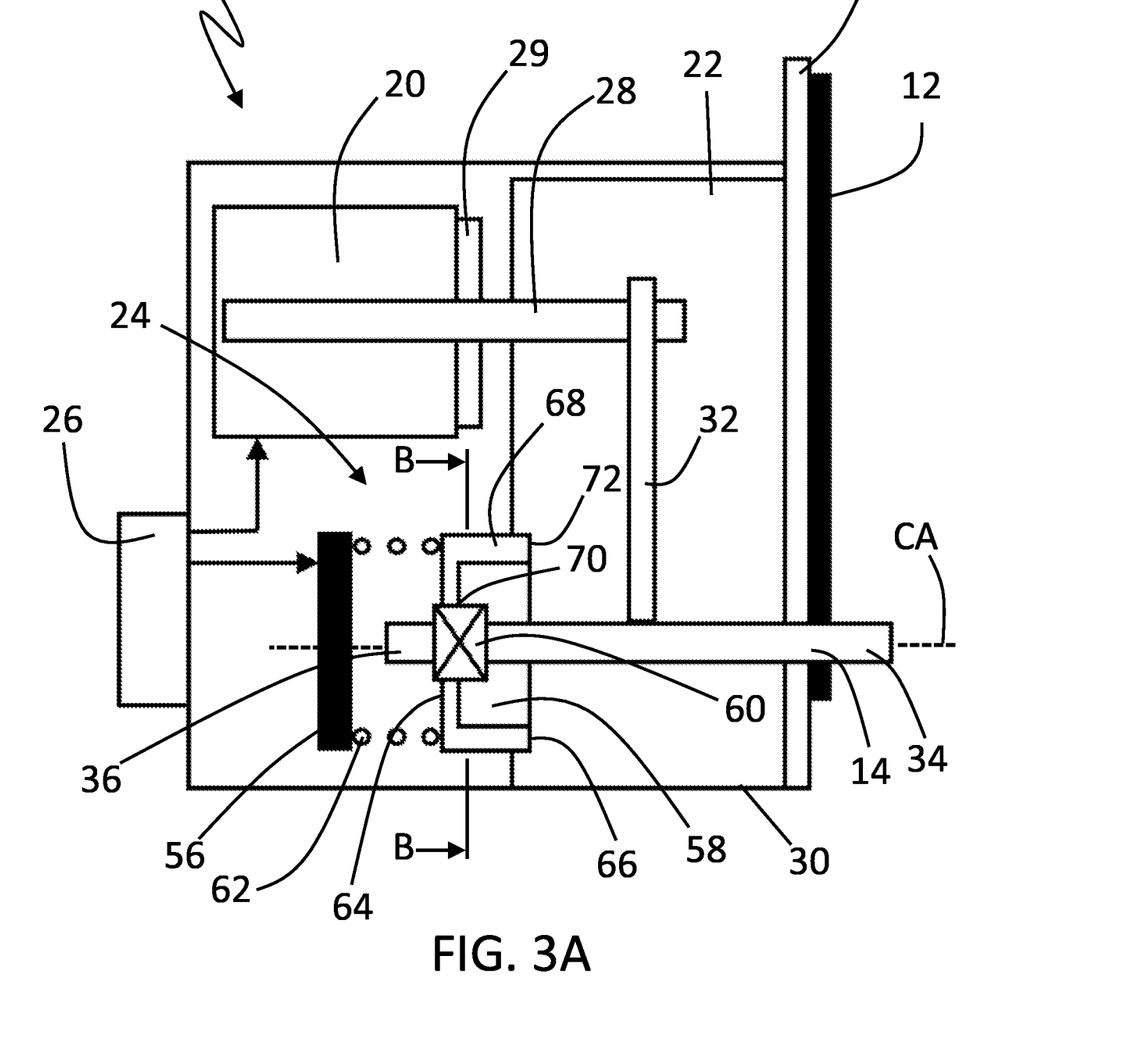
FIG. 3A is a schematic diagram of the windshield wiper system with another example of the brake system locking the wiper shaft from rotation while the wiper arm is in the park position.
Figure 3B:
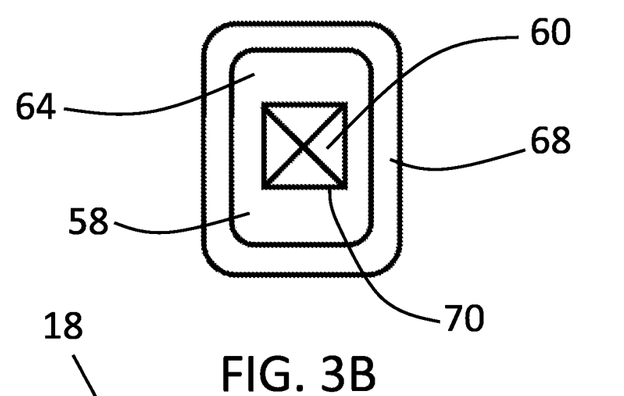
FIG. 3B is a cross-sectional view of the brake system from FIG. 3A taken along line B-B.
Figure 3C:
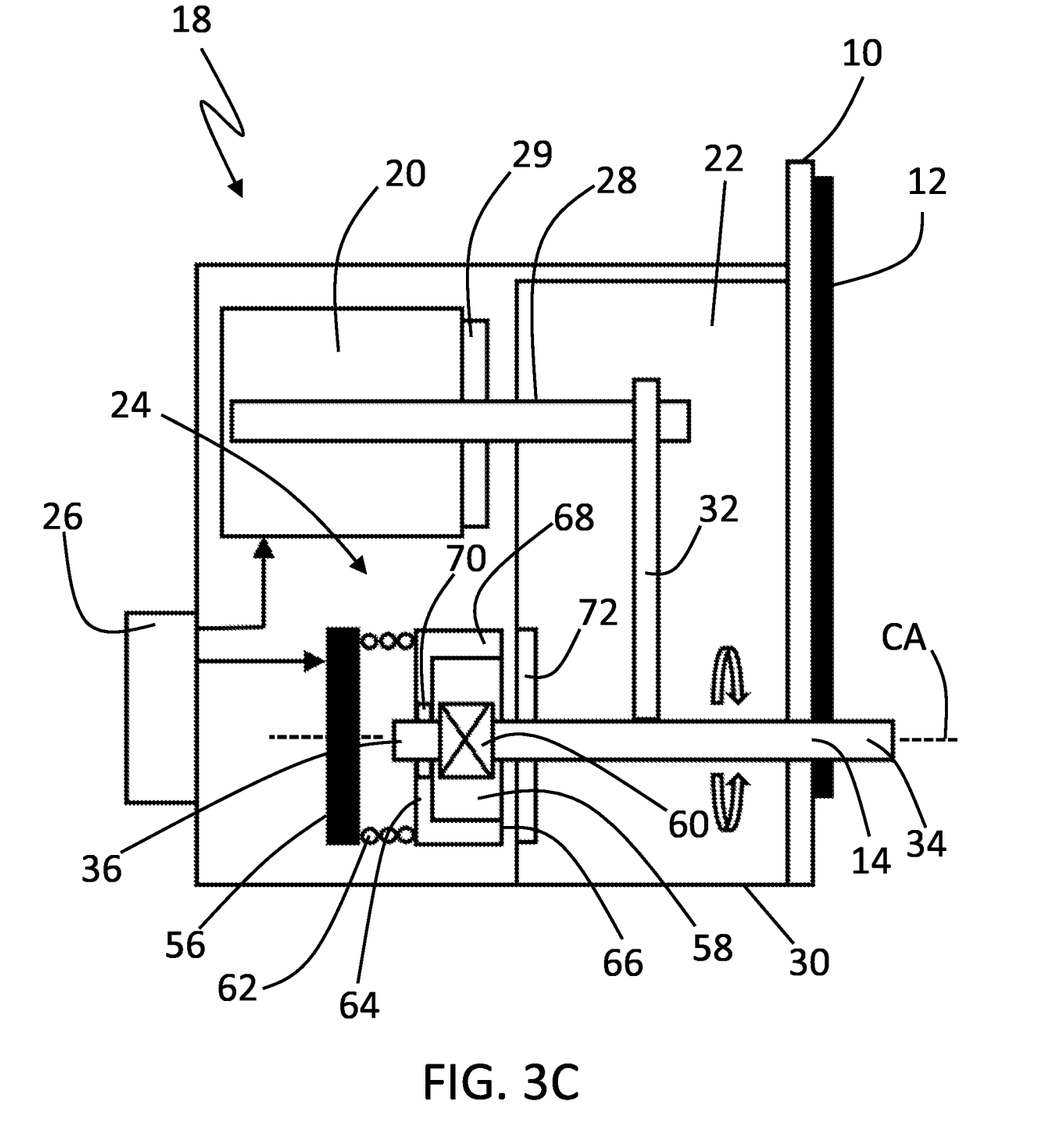
FIG. 3C is another schematic diagram of the windshield wiper system from FIG. 3A with the brake system disengaged such that the wiper shaft and the wiper arm can rotate out of the park position.

FIGS. 3A-3C will be discussed concurrently. FIGS. 3A-3C show another example of windshield wiper system 18 with an alternative example of brake system 24. FIG. 3A is a schematic diagram of windshield wiper system 18 with brake system 24 in a de-energized mode such that brake system 24 locks with wiper 14 to prevent movement of wiper arm 12. FIG. 3B is a cross-sectional view of brake system 24 from FIG. 3A taken along line B-B. FIG. 3C is another schematic diagram of windshield wiper system 18 from FIG. 3A with brake system 24 in an energized mode such that wiper shaft 14 is unlocked with brake system 24 and wiper shaft 14 and wiper arm 12 can rotate out of park position 16. Similar to the example of FIGS. 2A-2C, the example of windshield wiper system 18 in FIGS. 3A-3C includes windshield 10, wiper arm 12, wiper shaft 14, electric motor 20, gearbox 22, brake system 24, and system controller 26. In the example shown in FIGS. 3A-3C, windshield 10, wiper arm 12, wiper shaft 14, electric motor 20, gearbox 22, and system controller 26 are similar to the example of FIGS. 2A-2C described above. In the example of FIGS. 3A-3C, brake system includes electromagnet 56, cup 58, key block 60, and spring 62. Cup 58 is a non-circular cup that includes non-circular bottom 64, top edge 66, walls 68, and non-circular hole 70. Housing 30 of gearbox 22 includes recess 72. In the example of FIGS. 3A-3C, cup 58, key block 60, and the non-circular hole 70 in cup 58 each includes a rectangular profile.

In the example of FIGS. 3A-3C, electromagnet 56 drives brake system 24 and cup 58, key block 60, and spring 62 together form an anti-rotation assembly. Key block 60 forms a first element of the anti-rotation assembly and is connected directly to wiper shaft 14. As shown in FIG. 3C, key block 60 includes a rectangular profile.

Cup 58 forms a second element of the anti-rotation assembly that is rotationally stationary relative to wiper shaft 14 and key block 60. Cup 58 also includes a non-circular profile. As shown in FIG. 3C, non-circular bottom 64, top edge 66, and walls 68 are all shaped such that cup 58 has a rectangular profile. Top edge 66 is spaced axially from non-circular bottom 64 relative to center axis CA of wiper shaft 14. Walls 68 extend axially from non-circular bottom 64 to top edge 66. Non-circular bottom 64 forms a plate to accommodate non-circular hole 70. Non-circular hole 70 extends axially through non-circular bottom 64 and is centered on center axis CA of wiper shaft 14. In the example of FIGS. 3A-3C, non-circular hole 70 includes a rectangular profile that mates with the rectangular profile of key block 60 when wiper arm 12 is in park position 16 and electromagnet 56 is not active.

Second end 36 of wiper shaft 14 can extend through non-circular hole 70. In the example of FIGS. 3A-3C, key block 60 is a plunger that mates with non-circular hole 70 to rotationally lock wiper shaft 14 and prevent wiper arm 12 from moving out of park position 16.

Spring 62 is axially between cup 58 and electromagnet 56 and is compressed between cup 58 and electromagnet 56 and biases cup 58 toward recess 72 formed in housing 30 of gearbox 22.

Non-circular hole 70 in cup 58 interlocks with key block 60 to prevent rotation of key block 60 and wiper shaft 14 when both electromagnet 56 is in the de-energized mode and wiper arm 12 is in the park position (as shown in FIG. 3A). Key block 60 is outside of non-circular hole 70 when electromagnet 56 is in the energized mode. Key block 60 is mated with the non-circular hole 70 when wiper arm 12 is in park position 16 and electromagnet 56 is in the de-energized mode. Recess 72 is formed in housing 30 of gearbox 22 and includes a recess profile that mates with top edge 66 when wiper arm 12 is in park position 16 and electromagnet 56 is in the de-energized mode. In an alternate example, cup 58 could be flipped such that non-circular bottom 64 mates with the recess profile of recess 72 when wiper arm 12 is in park position 16 and electromagnet 56 is in the de-energized mode. Mating cup 58 with recess 72 also helps lock wiper shaft 14 and wiper arm 12 when wiper arm 12 is in the park position.

Both examples of windshield wiper system 18 in FIGS. 2A-2C and FIGS. 3A-3C provide an example of brake system 24 that locks wiper shaft 14 and keeps wiper arm 12 in park position 16. By locking wiper arm 12 into park position 16, the examples of brake system 24 in FIGS. 2A-2C and FIGS. 3A-3C prevents aerodynamic forces from acting on wiper arm 12 and shifting wiper arm 12 on windshield 10 and into a field of vision of the pilot.

The following are non-exclusive descriptions of possible embodiments of the present invention.

DISCUSSION OF POSSIBLE EMBODIMENTS

A windshield wiper system for an aircraft includes a wiper arm and a wiper shaft with a first end connected to a base of the wiper arm. The wiper shaft also includes a second end opposite the first end. An electric motor is coupled to the wiper shaft to rotationally drive the wiper shaft. The windshield wiper system also includes a brake system. The brake system includes an electromagnet comprising an energized mode and a de-energized mode. The brake system also includes an anti-rotation assembly with a first element and a second element. The first element is connected directly to the wiper shaft. The second element is rotationally stationary relative the wiper shaft and the first element. The second element is configured to interlock with the first element to prevent rotation of the first element and the wiper shaft when both the electromagnet is in the de-energized mode and the wiper arm is in a park position.

The windshield wiper system of the preceding paragraph can optionally include, additionally and/or alternatively, any one or more of the following features, configurations and/or additional components:

the first element comprises: a plate extending radially outward from the wiper shaft relative a center axis of the wiper shaft; and at least one hole extending axially into the plate relative the center axis of the wiper shaft;

the second element comprises: a plunger rod that is ferromagnetic and aligned with the hole when the wiper arm is in the park position;

the plunger rod comprises: a first rod end that is conical and sized for insertion into the hole in the plate; a second rod end opposite the first rod end, wherein the second rod end slides within a slot of a housing of the electromagnet; and a flange positioned axially between the first rod end and the second rod end relative to a center axis of the plunger rod, and extending radially outward from first rod end and the second rod end relative to the center axis of the plunger rod;

a spring extending circumferentially around the plunger rod and compressed between the flange and the housing of the electromagnet;

the first element comprises: a key block connected to the wiper shaft and comprising a non-circular profile;

the second element comprises: a non-circular cup comprising: a non-circular bottom; a top edge spaced axially from the non-circular bottom relative the center axis of the wiper shaft; at least one wall extend axially from the non-circular bottom to the top edge; and a non-circular hole extending axially through the non-circular bottom, wherein the non-circular hole is centered on the center axis of the wiper shaft, wherein the non-circular hole comprises a profile that mates with the non-circular profile of the key block, wherein the second end of the wiper shaft extends through the non-circular hole, wherein the key block is outside of the non-circular hole when the electromagnet is in the energized mode, and wherein the key block is mated with the non-circular hole when the wiper arm is in the park position and the electromagnet is in the de-energized mode;

a gearbox mechanically connecting the wiper shaft to a rotor shaft of the electric motor; and a recess formed in a housing of the gearbox, and wherein the recess comprises a recess profile that mates with the top edge or the non-circular bottom of the non-circular cup when the wiper arm is in the park position and the electromagnet is in the de-energized mode;

a spring compressed between the non-circular cup and the electromagnet and biasing the non-circular cup toward the recess formed in the housing of the gearbox;

the non-circular cup, the key block, and the non-circular hole in the non-circular cup all each comprise a rectangular profile; and/or a system controller in electrical communication with both the electric motor and the electromagnet.

In another example, a windshield wiper system includes a wiper arm and a wiper shaft with a first end connected to a base of the wiper arm and a second end opposite the first end. The windshield wiper system further includes an electric motor that is rotationally connected to the wiper shaft and a brake system. The brake system includes a lock plate extending radially outward from the second end of the wiper shaft relative to a center axis of the wiper shaft. A hole extends into the lock plate. An electromagnetic plunger mechanism includes a plunger and an electromagnet. The plunger is aligned with the hole when the wiper arm is in a park position. The electromagnet is configured to interlock the plunger with the hole and disengage the plunger from the hole when the wiper arm is in the park position.

The windshield wiper system of the preceding paragraph can optionally include, additionally and/or alternatively, any one or more of the following features, configurations and/or additional components:

the hole is centered on the lock plate, wherein the hole comprises a non-circular profile, and wherein the plunger comprises a non-circular cross-sectional profile that mates with the non-circular profile of the hole in the lock plate;

the hole is off-centered on the lock plate;

a spring axially between the lock plate and the electromagnet relative to the center axis of the wiper shaft and biasing the plunger toward the hole in the lock plate;

a system controller in electrical communication with both the electric motor and the electromagnet; and/or a gearbox mechanically connecting the wiper shaft to a rotor shaft of the electric motor.

In another example, a method is disclosed for operating a windshield wiper system. The method includes sending, by an operator, an off signal to a system controller in communication with an electric motor that drives a wiper shaft connected to a wiper arm. In response to the off signal, the system controller directs the electric motor to rotate the wiper shaft to move the wiper arm to a park position on the windshield. The system controller deactivates the electric motor. The wiper shaft is locked into the park position by deactivating an electromagnetic mechanism, by the system controller, to allow a plunger to extend out of the electromagnetic mechanism and into a hole formed in a plate connected to the wiper shaft.

The method of the preceding paragraph can optionally include, additionally and/or alternatively, any one or more of the following features, configurations and/or additional components:

sending, by the operator, an on signal to the system controller; activating, by the system controller in response to the on signal, the electromagnetic mechanism to retract the plunger out of the hole formed in the plate; and activating, by the system controller, the electric motor to rotate the wiper shaft and the plate to move the wiper arm out of the park position; and/or extending, by springs compressed between a flange on the plunger and a housing of the electromagnetic mechanism, the plunger out of the electromagnetic mechanism after deactivation of the electromagnetic mechanism.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A windshield wiper system for an aircraft comprising:
   a wiper arm;
   a wiper shaft comprising:
   a first end connected to a base of the wiper arm; and
   a second end opposite the first end;
   an electric motor coupled to the wiper shaft to rotationally drive the wiper shaft via, the electric motor coupled to the wiper shaft via gearing disposed between the first end and the second end of the wiper shaft;
a brake system comprising:
an electromagnet comprising an energized mode and a de-energized mode; and
an anti-rotation assembly comprising:
a first element connected directly to the wiper shaft at the second end and separated from the gearing, wherein the first element comprises:
a plate extending radially outward from the wiper shaft relative to a center axis of the wiper shaft; and
at least one hole extending axially into the plate relative to the center axis of the wiper shaft; and
a second element that is rotationally stationary relative to the wiper shaft and the first element, wherein the second element is configured to interlock with the first element to prevent rotation of the first element and the wiper shaft when both the electromagnet is in the de-energized mode and the wiper arm is in a park position, wherein the second element comprises:
a plunger rod that is ferromagnetic and aligned with the hole when the wiper arm is in the park position, the plunger rod comprising:
a first rod end that is conical and sized for insertion into the hole in the plate;
a second rod end opposite the first rod end, wherein the second rod end slides within a slot of a housing of the electromagnet; and
a flange positioned axially between the first rod end and the second rod end relative to a center axis of the plunger rod, and extending radially outward from first rod end and the second rod end relative to the center axis of the plunger rod.

2. The windshield wiper system of claim 1, further comprising:
a spring extending circumferentially around the plunger rod and compressed between the flange and the housing of the electromagnet.

3. The windshield wiper system of claim 1, further comprising:
a system controller in electrical communication with both the electric motor and the electromagnet.

4. The windshield wiper system of claim 1, wherein the electromagnet is disposed axially between the first end and the second end of the wiper shaft and extends circumferentially about the wiper shaft.

* * * * *